US012785142B2

(12) United States Patent
Lin et al.

(10) Patent No.: US 12,785,142 B2
(45) Date of Patent: Nov. 3, 2026

(54) SOLID ELECTROLYTE DOPED WITH FLUORINE AND ALL SOLID-STATE BATTERY COMPRISING SAME

(71) Applicant: Factorial Inc., Billerica, MA (US)

(72) Inventors: Yuying Steven Lin, Billerica, MA (US); Fang Hao, Andover, MA (US); Hyun Seok Kim, Lexington, MA (US); Daniel Wakaba, Lawrence, MA (US)

(73) Assignee: Factorial Inc., Billerica, MA (US)

( * ) Notice: Subject to any disclaimer, the term of this patent is extended or adjusted under 35 U.S.C. 154(b) by 50 days.

(21) Appl. No.: 19/238,360

(22) Filed: Jun. 14, 2025

(65) Prior Publication Data

US 2025/0385303 A1 Dec. 18, 2025

Related U.S. Application Data

(60) Provisional application No. 63/660,862, filed on Jun. 17, 2024.

(51) Int. Cl.

| | |
|---|---|
| ***C01B 25/14*** | (2006.01) |
| ***H01M 4/62*** | (2006.01) |
| ***H01M 10/0562*** | (2010.01) |
| ***H01M 10/058*** | (2010.01) |

(52) U.S. Cl.

CPC ......... *H01M 10/0562* (2013.01); *C01B 25/14* (2013.01); *H01M 4/622* (2013.01); *H01M 4/625* (2013.01); *H01M 4/628* (2013.01); *H01M 10/058* (2013.01); *C01P 2002/54* (2013.01); *C01P 2002/72* (2013.01); *C01P 2006/40* (2013.01); *H01M 2300/008* (2013.01)

(58) Field of Classification Search

None

See application file for complete search history.

(56) References Cited

U.S. PATENT DOCUMENTS

| | | | |
|---|---|---|---|
| 10,938,064 | B2 | 3/2021 | Ito et al. |
| 11,196,083 | B2 | 12/2021 | Takahashi et al. |
| 11,264,642 | B2 | 3/2022 | Utsuno et al. |
| 11,444,317 | B2 | 9/2022 | Utsuno et al. |

(Continued)

FOREIGN PATENT DOCUMENTS

| | | | | |
|---|---|---|---|---|
| EP | 4557431 A1 * | 5/2025 | .......... | H01M 10/052 |
| WO | 2024096517 A1 | 5/2024 | | |

OTHER PUBLICATIONS

Arnold, W., Shreyas, V., Li, Y., Koralalage, M.K., Jasinski, J.B., Thapa, A., Sumanasekera, G., Ngo, A.T., Narayanan, B. and Wang, H., Synthesis of fluorine-doped lithium argyrodite solid electrolytes for solid-state lithium metal batteries. ACS Applied Materials & Interfaces, 2022, 14(9), 11483-11492.

(Continued)

*Primary Examiner* — Yoshitoshi Takeuchi

(57) ABSTRACT

Disclosed is a solid argyrodite electrolyte doped with fluorine (F). In some embodiments, the argyrodite electrolyte has a formula (I), $Li_{7-n}PS_{6-n}Ha_{n-x}F_x$ (I), wherein Ha is a halogen element other than fluorine (F), $0.02 \le x < 0.1$, and $1.0 < n < 2.0$. In some embodiments, $1.2 \le n \le 1.6$. In some embodiments, $0.02 \le x \le 0.08$. In some embodiments, the ASSB comprising the solid argyrodite electrolyte exhibits an increased CCD and an improved electrochemical performance.

18 Claims, 4 Drawing Sheets

(56) References Cited

U.S. PATENT DOCUMENTS

| | | | | |
|---|---|---|---|---|
| 11,652,236 | B2 | 5/2023 | Terai et al. | |
| 12,183,879 | B2 | 12/2024 | Utsuno et al. | |
| 2010/0290969 | A1* | 11/2010 | Deiseroth | H01M 10/0562 423/303 |
| 2011/0081580 | A1* | 4/2011 | Stadler | H01M 10/0562 429/319 |
| 2017/0117547 | A1* | 4/2017 | Fanous | H01M 4/364 |
| 2019/0221884 | A1* | 7/2019 | Utsuno | H01B 1/10 |
| 2020/0006808 | A1* | 1/2020 | Utsuno | H01B 13/00 |
| 2020/0127325 | A1* | 4/2020 | Takahashi | H01M 4/133 |
| 2020/0185768 | A1* | 6/2020 | Kang | H01M 10/052 |
| 2021/0075058 | A1* | 3/2021 | Nakayama | H01B 1/122 |
| 2021/0143468 | A1* | 5/2021 | Kim | H01M 4/134 |
| 2021/0242490 | A1* | 8/2021 | Ku | H01M 10/0562 |
| 2021/0257624 | A1* | 8/2021 | Lee | H01M 4/405 |
| 2021/0280873 | A1* | 9/2021 | Ku | H01M 4/382 |
| 2022/0109184 | A1* | 4/2022 | Tsujimura | H01M 10/052 |
| 2022/0140385 | A1 | 5/2022 | Kanamori | |
| 2022/0263122 | A1* | 8/2022 | Nakayama | H01B 1/08 |
| 2023/0163353 | A1* | 5/2023 | Fujii | H01M 4/1391 429/322 |
| 2023/0246227 | A1* | 8/2023 | Fujii | H01B 1/06 429/322 |
| 2023/0261254 | A1* | 8/2023 | Du | H01M 10/0562 |
| 2023/0275265 | A1* | 8/2023 | Kim | H01M 4/133 429/323 |
| 2023/0378524 | A1 | 11/2023 | Kim et al. | |
| 2024/0194938 | A1* | 6/2024 | Kim | H01M 10/0525 |
| 2024/0234805 | A1* | 7/2024 | Fujii | H01M 10/052 |
| 2024/0234809 | A1 | 7/2024 | Fujii et al. | |
| 2024/0266596 | A1 | 8/2024 | Kitamura et al. | |
| 2024/0266598 | A1* | 8/2024 | Fujii | C01B 25/14 |
| 2025/0015341 | A1* | 1/2025 | Hood | H01M 10/0585 |

OTHER PUBLICATIONS

Jin, M., Wang, J., Weng, K., Sun, T., Guo, D., Wang, X., Chen, X.A. and Wang, S., Fluorinated solid-state electrolytes for lithium batteries: interface design and ion conduction mechanisms. Advanced Engineering Materials, 2023, 25(8), 2201390.

Nie, X., Hu, J. and Li, C., Halide-based solid electrolytes: The history, progress, and challenges. Interdisciplinary Materials, 2023, 2(3), 365-389.

Peng, L., Lei, T., Liao, C., Chen, S., Cheng, S. and Xie, J. Fluorine-doped electrolyte and artificial SEI for enhanced interfacial stability in all-solid-state lithium metal batteries. ACS Applied Engineering Materials, 2024, 2(6),1698-1705.

Yang, H. and Wu, N., Ionic conductivity and ion transport mechanisms of solid-state lithium-ion batten/ electrolytes: A review. Energy Science & Engineering, 2022, 10(5),1643-1671.

Zhao, F., Sun, Q., Yu, C., Zhang, S., Adair, K., Wang, S., Liu, Y., Zhao, Y., Liang, J., Wang, C. and Li, X., Ultrastable anode interface achieved by fluorinating electrolytes for all-solid-state Li metal batteries. ACS Energy Letters, 2020, 5(4), 1035-1043.

Zhou, L., Minafra, N., Zeier, W.G. and Nazar, L.F., Innovative approaches to Li-argyrodite solid electrolytes for all-solid-state lithium batteries. Accounts of chemical research, 2021, 54(12), 2717-2728.

* cited by examiner

SOLID ELECTROLYTE DOPED WITH FLUORINE AND ALL SOLID-STATE BATTERY COMPRISING SAME

CROSS-REFERENCE

The present application claims the benefit of U.S. Ser. No. 63/660,862, filed Jun. 17, 2024, the entire content of which is incorporated herein by reference into this application.

FIELD

Disclosed are a solid electrolyte doped with fluorine and an all solid-state battery (ASSB) comprising the same.

BACKGROUND

Organic solvents in liquid electrolyte or semi-solid electrolyte are usually flammable and may cause fire or even explosion. Inorganic solid electrolytes for all solid-state batteries (ASSBs) attract more attention due to their better safety profile in comparison to conventional solvents. Formation and growth of lithium dendrite, however, may penetrate the inorganic solid electrolyte and deteriorate the high-rate property, cycling performance and/or safety. Critical current density (CCD) is the maximum available current density of a solid-state battery without causing failure due to growth of lithium dendrite. CCD is related to the power density and is crucially important in evaluating efficacy of solid electrolytes. However, solid electrolytes usually exhibit a lower CCD in comparison with liquid electrolytes. Thus, there remains a need for new ASSBs with higher CCD and cycling performance.

SUMMARY

The present disclosure provides a solid argyrodite electrolyte doped with fluorine (F) and an all solid-state battery (ASSB) comprising the electrolyte. In some embodiments, the solid argyrodite electrolyte has a formula (I), $Li_{7-n}PS_{6-n}Ha_{n-x}F_x$ (I), wherein Ha is a halogen element other than fluorine (F), $0.02 \leq x < 0.1$, and $1.0 < n < 2.0$. In some embodiments, Ha comprises at least one selected from the group consisting of chlorine (Cl), bromine (Br), iodine (I), astatine (At), and tennessine (Ts).

In some embodiments, Ha in Formula (I) comprises at least two different halogen elements other than fluorine (F) and the solid argyrodite electrolyte has a formula (II), $Li_{7-n}PS_{6-n}Ha1_{n-x-y}Ha2_yF_x$ (II), wherein each of Ha1 and Ha2 comprises at least one selected from the group consisting of chlorine (Cl), bromine (Br), iodine (I), astatine (At), and tennessine (Ts), and Ha1 is different from Ha2, wherein $0.02 \leq y \leq 0.4$.

In some embodiments, the ASSB comprising the solid electrolyte exhibits an increased CCD and an improved electrochemical performance.

The following terms shall be used to describe the present disclosure. In the absence of a specific definition set forth herein, the terms used to describe the present disclosure shall be given their common meaning as understood by those of ordinary skill in the art.

A solid electrolyte (SE) layer (alternatively, solid electrolyte membrane or electrolyte film) refers to a thin structure that allows transportation or flow of ions and prevents electronic contact between a cathode and an anode. An SE layer may or may not comprise a scaffold layer which depends on the preparation method. An SE layer has a typical thickness in a range from 5 μm to 300 μm.

A scaffold layer refers to a mechanical support layer that is impregnated with an electrolyte. An example of a scaffold layer includes a non-woven substrate with self-supporting property. In some embodiments, scaffold layer is alternatively termed as mechanical support layer, mechanical scaffold layer, or support layer.

An anode layer comprises an anode current collector and an optional anode active material layer.

An anode protective layer (alternatively anode interlayer or anode sublayer) is a layer or sublayer interposed between an SE layer and an anode active material layer (or anode current collector). Without wishing to be bound by any theory, such anode protective layer may protect the anode layer, SE layer or both.

BRIEF DESCRIPTION OF THE FIGURES

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure.

DETAILED DESCRIPTION

Figure 1:
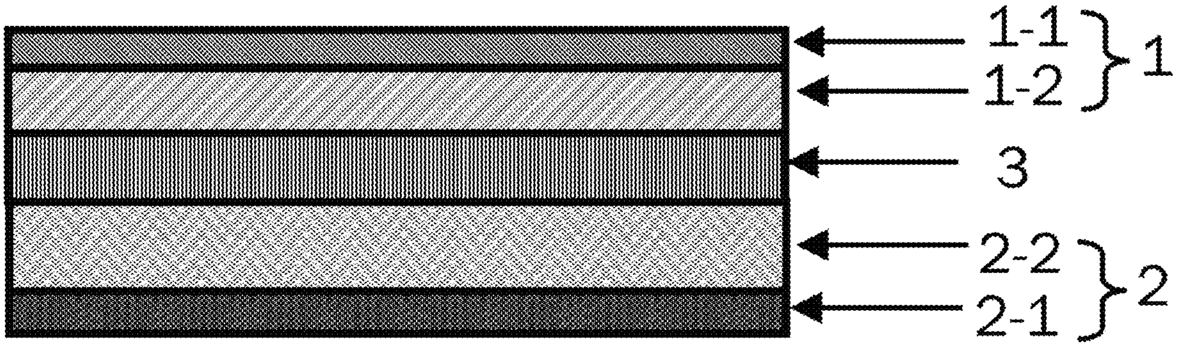
FIG. 1 illustrates a representative configuration of an all-solid-state battery (ASSB) with an SE layer.
Figure 2:
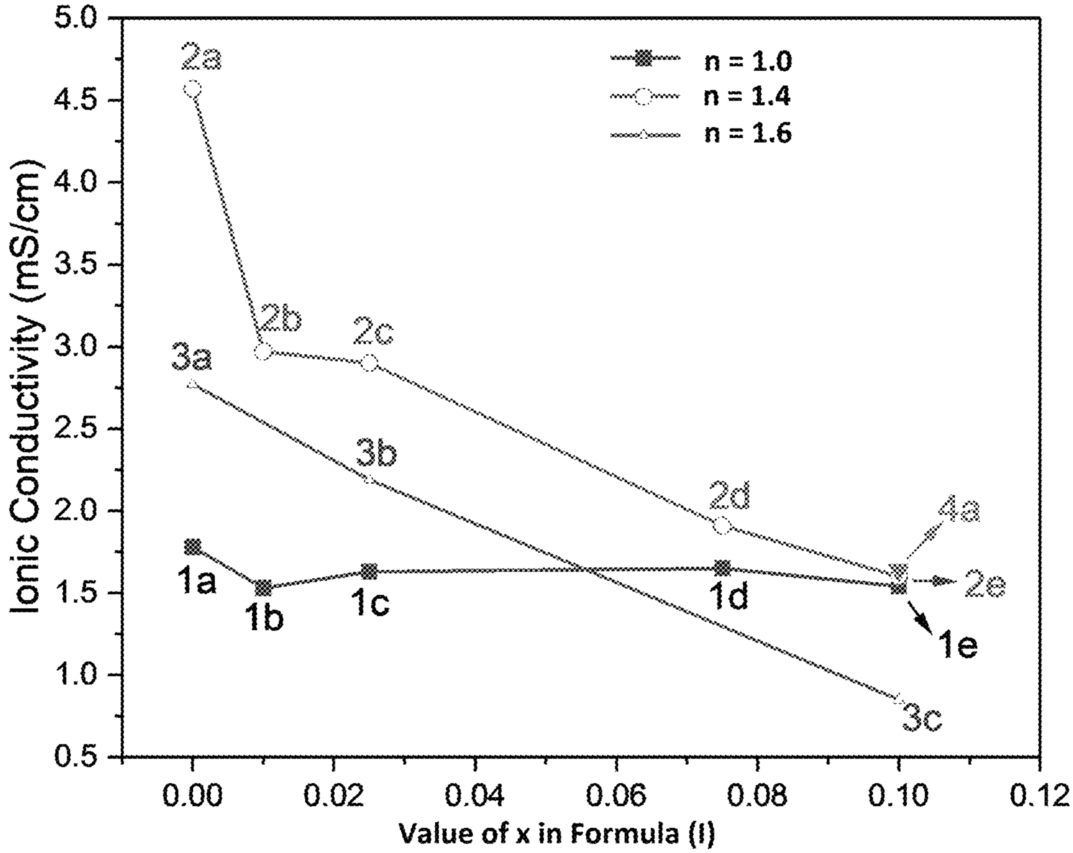
FIG. 2 shows the ionic conductivities of representative solid argyrodite electrolytes according to some embodiments of the present disclosure.
Figure 3:
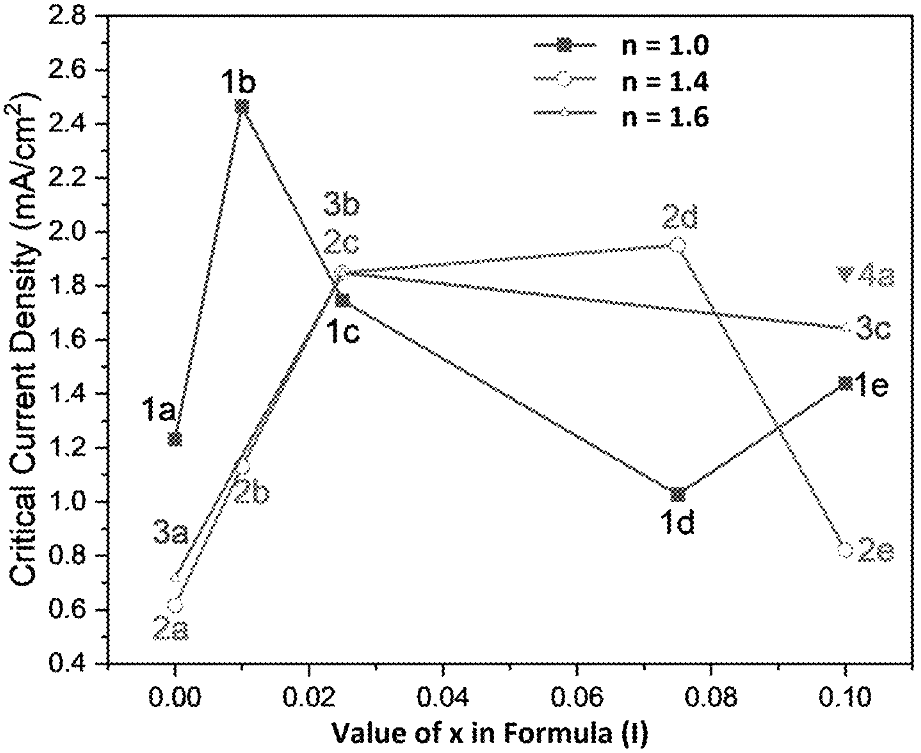
FIG. 3 shows the CCDs of representative solid argyrodite electrolytes according to some embodiments of the present disclosure.

A cross-sectional view of an all-solid-state battery (ASSB) is shown in FIG. 1. Such ASSB comprises an anode layer (1), a cathode layer (2), and a solid electrolyte (SE) layer (3) interposed between the anode layer (1) and the cathode layer (2). In some embodiments, the anode layer (1) comprises an anode current collector (1-1) and an anode active material layer (1-2) on the anode current collector (1-1). In some embodiments, the cathode layer (2) comprises a cathode current collector (2-1) and a cathode active material layer (2-2) on the cathode current collector (2-1).

The present disclosure provides a solid argyrodite electrolyte doped with fluorine (F) and an all-solid-state battery (ASSB) comprising the same. In some embodiments, the solid argyrodite electrolyte has a formula (I), $Li_{7-n}PS_{6-n}Ha_{n-x}F_x$ (I), wherein Ha is a halogen element other than fluorine (F), 0.02≤x<0.1, and 1.0<n<2.0. In some embodiments, Ha comprises at least one selected from the group consisting of chlorine (Cl), bromine (Br), iodine (I), astatine (At), and tennessine (Ts). In some embodiments, 0.02≤x≤0.08.

In some embodiments, Ha in Formula (I) comprises at least two different halogen elements other than fluorine (F) and the solid argyrodite electrolyte (alternatively argyrodite solid electrolyte) has a formula (II), $Li_{7-n}PS_{6-n}Ha1_{n-x-y}Ha2_yF_x$ (II), wherein each of Ha1 and Ha2 comprises at least one selected from the group consisting of chlorine (Cl), bromine (Br), iodine (I), astatine (At), and tennessine (Ts), and Ha1 is different from Ha2, wherein 0.02≤y≤0.4.

In some embodiments, the total molar amounts of halogen elements (n) are higher than 1.0. In some embodiments, the total molar amounts of halogens (n) are equal to or greater than 1.10, 1.20 or 1.30, i.e., n≥1.10, n≥1.20, or n≥1.30. In some embodiments, the total molar amount of halogen elements in formula (I) is no greater than 2.0. In some embodiments, the total molar amount of halogen elements in formula (I) is in a range from 1.2 to 1.6. In some embodiments, the total molar amount of halogens (n) is in a range from 1.05 to 1.80, from 1.05 to 1.75, from 1.05 to 1.70, from 1.05 to 1.65, from 1.05 to 1.60, from 1.05 to 1.55, from 1.05 to 1.50, from 1.05 to 1.45, from 1.05 to 1.40, from 1.10 to 1.80, from 1.10 to 1.75, from 1.10 to 1.70, from 1.10 to 1.65, from 1.10 to 1.60, from 1.10 to 1.55, from 1.10 to 1.50, from 1.10 to 1.45, from 1.10 to 1.40, from 1.15 to 1.80, from 1.15 to 1.75, from 1.15 to 1.70, from 1.15 to 1.65, from 1.15 to 1.60, from 1.15 to 1.55, from 1.15 to 1.50, from 1.15 to 1.45, from 1.15 to 1.40, from 1.20 to 1.80, from 1.20 to 1.75, from 1.20 to 1.70, from 1.20 to 1.65, from 1.20 to 1.60, from 1.20 to 1.55, from 1.20 to 1.50, from 1.20 to 1.45, or from 1.20 to 1.40.

In some embodiments, the molar amount of F (x) in formula (I) is not greater than 0.1. In some embodiments, the total molar amount of F is equal to or greater than 0.02. In some embodiments, the total molar amount of F in formula (I) is in a range from 0.02 to 0.08. In some embodiments, the molar amount of F (x) is in a range from 0.01 to 0.08, from 0.01 to 0.07, from 0.01 to 0.06, from 0.01 to 0.05, from 0.01 to 0.04, from 0.02 to 0.08, from 0.02 to 0.07, from 0.02 to 0.06, from 0.02 to 0.05 or from 0.02 to 0.04.

In some embodiments, the total molar amount of lithium (7-*n*) has a value higher than 5.0 and lower than 6.0. When n is in a range from 1.2 to 1.8, the total molar amount of lithium (7-*n*) is in a range from 5.2 to 5.8. When n is in a range from 1.2 to 1.6, the total molar amount of lithium (7-*n*) is in a range from around 5.4 to 5.8. When n is in a range from 1.2 to 1.4, the total molar amount of lithium (7-*n*) is in a range from around 5.6 to 5.8. In some embodiments, the total molar amount of lithium in formula (I) is around 5.4, 5.6, 5.7 or 5.8.

In some embodiments, the solid argyrodite electrolyte comprises at least one selected from the group consisting of $Li_{5.6}PS_{4.6}Cl_{1.375}F_{0.025}$, $Li_{5.6}PS_{4.6}Cl_{1.35}F_{0.05}$, $Li_{5.6}PS_{4.6}Cl_{1.325}F_{0.075}$, $Li_{5.6}PS_{4.6}Br_{1.375}F_{0.025}$, $Li_{5.6}PS_{4.6}Br_{1.35}F_{0.05}$, $Li_{5.6}PS_{4.6}Br_{1.325}F_{0.075}$, $Li_{5.6}PS_{4.6}I_{1.375}F_{0.025}$, $Li_{5.6}PS_{4.6}I_{1.325}F_{0.075}$, $Li_{5.6}PS_{4.6}I_{1.35}F_{0.05}$, $Li_{5.4}PS_{4.4}Cl_{1.575}F_{0.025}$, $Li_{5.4}PS_{4.4}Cl_{1.55}F_{0.05}$, $Li_{5.4}PS_{4.4}Cl_{1.525}F_{0.075}$, $Li_{5.4}PS_{4.4}Br_{1.575}F_{0.025}$, $Li_{5.4}PS_{4.4}Br_{1.55}F_{0.05}$, $Li_{5.4}PS_{4.4}Br_{1.525}F_{0.075}$, $Li_{5.4}PS_{4.4}I_{1.575}F_{0.025}$, $Li_{5.4}PS_{4.4}I_{1.55}F_{0.05}$, $Li_{5.4}PS_{4.4}I_{1.525}F_{0.075}$, and mixtures thereof In some embodiments, the molar amount of F (x) in formula (I) is 0.1. In some embodiments, the solid argyrodite electrolyte comprises $Li_{5.6}PS_{4.6}Cl_{1.3}F_{0.1}$, $Li_{5.6}PS_{4.6}Br_{1.3}F_{0.1}$, $Li_{5.6}PS_{4.6}I_{1.3}F_{0.1}$, $Li_{5.4}PS_{4.4}Cl_{1.5}F_{0.1}$, $Li_{5.4}PS_{4.4}Br_{1.5}F_{0.1}$, $Li_{5.4}PS_{4.4}I_{1.5}F_{0.1}$, $Li_{5.4}PS_{4.4}Cl_{1.2}Br_{0.3}F_{0.1}$, and mixtures thereof.

In some embodiments, an ASSB comprising the solid argyrodite electrolyte as disclosed herein exhibits a desirable ionic conductivity (IC). In some embodiments, the solid argyrodite electrolyte exhibits an ionic conductivity of at least 0.75 mS/cm, at least 1.00 mS/cm, at least 1.25 mS/cm, at least 1.50 mS/cm, at least 1.75 mS/cm, at least 2.00 mS/cm, at least 2.25 mS/cm, or at least 2.50 mS/cm at 20° C.

In some embodiments, an ASSB comprising the solid argyrodite electrolyte as disclosed herein exhibits a desirable critical current density (CCD). In some embodiments, an ASSB comprising the solid argyrodite electrolyte exhibits a CCD of at least 1.00 mA/cm$^2$, at least 1.20 mA/cm$^2$, at least 1.40 mA/cm$^2$, at least 1.60 mA/cm$^2$ or at least 1.80 mA/cm$^2$ at 75° C.

In some embodiments, an ASSB comprising the solid argyrodite electrolyte as disclosed herein exhibits both a desirable CCD and a desirable IC.

In some embodiments, the sulfide electrolyte in the SE layer as disclosed herein has a cubic crystal structure. In some embodiments, the sulfide electrolyte has a crystal structure in the $F\bar{4}3m$ space group as verified by XRD. In some embodiments, the solid electrolyte is a sulfide solid electrolyte having an argyrodite crystal structure. In some embodiments, the sulfide SE has an argyrodite crystal structure with three peaks at 2θ=25.8±0.3, 30.3±0.4 and 31.7±0.4 in X-ray diffractometry using a CuKα ray.

In some embodiments, the SE layer has an thickness in a range from 5 μm to 300 μm, from 10 μm to 300 μm, from 20 μm to 300 μm, from 50 μm to 300 μm, from 5 μm to 200 μm, from 10 μm to 200 μm, from 20 μm to 200 μm, from 50 μm to 200 μm, from 5 μm to 100 μm, from 10 μm to 100 μm, from 20 μm to 100 μm, from 50 μm to 100 μm, from 5 μm to 50 μm, from 10 μm to 50 μm, from 20 μm to 50 μm, or any and all ranges and subranges therebetween.

In some embodiments, the SE layer has a lithium-ion conductivity of no less than 0.05 mS/cm, no less than 0.1 mS/cm, no less than 0.2 mS/cm, no less than 0.5 mS/cm, no less than 0.75 mS/cm, no less than 1.0 mS/cm, no less than 1.6 mS/cm, no less than 1.8 mS/cm, no less than 2.0 mS/cm, or no less than 5.0 mS/cm, no less than 7.5 mS/cm or no less than 10.0 mS/cm at 20° C. In some embodiments, the solid electrolyte layer has a lithium-ion conductivity at 20° C. in a range from 0.05 mS/cm to 10.0 mS/cm, from 0.1 mS/cm to 10.0 mS/cm, from 0.25 mS/cm to 10.0 mS/cm, from 0.5 mS/cm to 10.0 mS/cm, from 0.75 mS/cm to 10.0 mS/cm, from 1.0 mS/cm to 10.0 mS/cm, from 2.0 mS/cm to 10.0 mS/cm, from 0.05 mS/cm to 7.5 mS/cm, from 0.1 mS/cm to 7.5 mS/cm, from 0.25 mS/cm to 7.5 mS/cm, from 0.5 mS/cm to 7.5 mS/cm, from 0.75 mS/cm to 7.5 mS/cm, from 1.0 mS/cm to 7.5 mS/cm, from 2.0 mS/cm to 7.5 mS/cm, from 0.05 mS/cm to 5.0 mS/cm, from 0.1 mS/cm to 5.0 mS/cm, from 0.25 mS/cm to 5.0 mS/cm, from 0.5 mS/cm to 5.0 mS/cm, from 0.75 mS/cm to 5.0 mS/cm, from 1.0 mS/cm to 5.0 mS/cm, or any and all ranges and subranges therebetween.

In some embodiments, the ASSB exhibits a capacity retention rate of at least 97.5%, at least 98.0%, at least 98.5%, at least 99.0%, at least 99.5% or at least 99.75% after at least 50 cycles at a rate of C/3 at 45° C.

In some embodiments, the ASSB exhibits a capacity retention rate of at least 94.0%, at least 94.5%, at least 95.0%, at least 95.5%, at least 96.0%, at least 96.5%, at least 97.0%, at least 97.5%, at least 98.0%, at least 98.5% or at least 99.0%, after at least 100 cycles at a rate of C/3 at 45° C.

In some embodiments, the cycling test can be performed at other C rates such as C/6, C/4, C/2, C, 1C, 2C, 3C, 5C, or any intermediate rate therebetween. In some embodiments, the cycling test can be performed at other temperatures such as −20° C., −10° C., 0° C., 10° C., 20° C., 25° C., 30° C., 40° C., 50° C., 80° C., or any intermediate temperature therebetween. Cycle life (cycling life) is determined by the number of cycles for a battery cell to reach a threshold value (for example, 80%, 85% or 90%) of its original capacity and is usually used to measure the cycling performance of a secondary battery. In some embodiments, the ASSB comprising the solid electrolyte doped with fluorine possesses a cycle life of at least 10%, at least 15%, at least 20%, at least 25%, at least 30%, at least 40%, at least 50%, or at least 60% longer than that of the ones with SE not doped with fluorine.

In one embodiment, the cathode active material layer in the cathode layer comprises a cathode electroactive material (CAM). In one embodiment, the CAM contains elements Li, Ni, and Co. In one embodiment, the CAM contains elements Li, Ni, and Co and at least one element of Mn and Al. In one embodiment, the CAM contains at least one element of Fe, and P.

In one embodiment, the CAM experiences a redox reaction at a potential of 2 V or above over Li/Li+ during operation of an ASSB.

In some embodiments, an ASSB comprises an anode layer, a cathode layer and an SE layer therebetween. In some embodiments, an anode layer comprises an anode current collector and optionally an anode active material layer. In some embodiments, the anode active material layer comprises an anode active material including without limitation lithium metal or a lithium alloy. In some embodiments, an anode active material layer is formed after the initial charge. In some embodiments, the anode active material comprises at least one selected from the group consisting of lithium, sodium, magnesium, aluminum, silicon, calcium, titanium, manganese, iron, cobalt, nickel, zinc, molybdenum, silver, indium, tin, and tungsten. In some embodiments, the anode active material layer is a composite layer comprising an anode active material and a carbonaceous material, wherein the anode active material is distributed in a matrix of the carbonaceous material. In some embodiments, the anode active material layer comprises one or more sublayers, wherein one sublayer is a layer of lithium metal, lithium alloy or lithiophilic material.

In some embodiments, an ASSB comprises a cathode layer, an SE layer, an anode protective layer, and an anode layer in the order. In some embodiments, an anode protective layer is described either as a component separate from an anode layer or a part of anode layer. In some embodiments, an anode protective layer is interposed between an SE layer and an anode active material layer or between an SE layer and an anode current collector.

In some embodiments, the anode protective layer is a layer comprising a carbonaceous material and a polymeric binder in the absence of lithium alloyable material (alternatively lithiophilic material).

In some embodiments, an ASSB comprises a cathode layer, an SE layer, an anode protective layer, and an anode layer in the order. In some embodiments, the anode layer comprises an anode current collector but without an anode active material layer, wherein the anode protective layer is interposed between the SE layer and the anode current collector layer.

In some embodiments, the anode layer comprises an anode active material layer and an anode current collector, wherein the anode protective layer is between the SE layer and the anode active material layer.

In some embodiments, the anode protective layer is a composite layer comprising a polymeric binder, a carbonaceous material and a lithiophilic material, wherein the lithiophilic material exists as particles distributed in a matrix of the carbonaceous material. In some embodiments, the carbonaceous material in the anode protective layer comprises at least one selected from the group consisting of carbon fiber, carbon nanotube, carbon black, acetylene black, Ketjen black, channel black, furnace black, lamp black, thermal black, natural graphite, artificial graphite and chemically reduced graphene oxide (cr-GO). In some embodiments, the lithiophilic material (M1) comprises at least one selected from the group consisting of Ag, Zn, Ti, Cd, Mg, Al, Ga, Si, Ge, In, Sn, Pb, Bi, and Sb. In some embodiments, the anode protective layer has a thickness in a range from 0.1 μm to 50 μm. In some embodiments, the carbonaceous material has a volume percentage in a range from 50% to 90%. In some embodiments, the particles of lithiophilic material (M1) have a volume percentage in a range from 10% to 50%. In some embodiments, the particles of lithiophilic material (M1) have a median particle size (D50) in a range from 20 nm to 150 nm.

In some embodiments, an anode protective layer is a composite layer comprising a polymeric binder, a carbonaceous material, a lithiophilic material (alternatively lithium alloyable) (M1) and a second material (M2) unalloyable with lithium, wherein both the lithiophilic material (M1) and second material (M2) exist as particles distributed in a matrix of the carbonaceous material. In some embodiments, the second material (M2) comprises at least one selected from the group consisting of Cu, Mo, Ir, W, Co, Ni, Ru, Fe, Se, Ta, Nb, V, and Zr. In some embodiments, the particles of the second material (M2) have a volume percentage lower than that of M1 and in a range from 1% to 30%. In some embodiments, the particles of the second material (M2) have a median particle size (D50) in a range from 10 nm to 150 nm.

In some embodiments, the polymeric binder has a weight percentage in a range from 3.0 wt % to 10 wt % in the anode protective layer. In some embodiments, the polymeric binder in the anode protective layer comprises a non-aqueous acrylate-type binder, a rubber-type binder such as styrene-butadiene rubber (SBR), poly(vinylidene fluoride) (PVDF), polyethylene (PE), vinylidene fluoride/hexafluoropropylene copolymer, polyvinylidene fluoride-co-trichloroethylene, polyacrylonitrile, polymethylmethacrylate, polyvinylpyrrolidone, polyvinylacetate, polyethylene-co-vinyl acetate, polyethylene oxide, polyarylate, cellulose acetate, cellulose acetate butyrate, cellulose acetate propionate, polysaccharide polymer and carboxyl methyl cellulose.

In some embodiments, an anode active material layer is assembled into an ASSB prior to the first charge. In some embodiments, an anode active material layer is formed after the first charge.

In some embodiments, the ASSB has a relatively high cathode loading. In some embodiments, the ASSB has a cathode loading of at least 4.0 mAh/cm$^2$, at least 4.5 mAh/cm$^2$, at least 5.0 mAh/cm$^2$, at least 5.5 mAh/cm$^2$, at least 6.0 mAh/cm$^2$, at least 6.5 mAh/cm$^2$, at least 6.8 mAh/cm$^2$, at least 7.2 mAh/cm$^2$, or at least 7.5 mAh/cm$^2$. A high cathode loading is critical to achieve a high energy density. However, a battery with a high cathode loading may be subject to a relatively fast decay, which ultimately leads to a lower capacity retention. In some embodiments, the present disclosure provides an ASSB with a high cathode loading having a good rate performance and cycling performance.

In some embodiments, the ASSB comprising the SE layer exhibits an initial specific capacity of at least 160 mAh/g, at least 165 mAh/g, at least 170 mAh/g, at least 175 mAh/g, at least 180 mAh/g, at least 185 mAh/g, or at least 190 mAh/g at a rate of C/3 at a temperature of 45° C. In some embodiments, the ASSB is tested at an external pressure in a range from 0.5 MPa to 5.0 MPa.

In some embodiments, the ASSB comprising the SE layer exhibits an initial CE of at least 85.0%, at least 86.0%, at least 87.0%, at least 88.0%, at least 89.0% or at least 90.0% at a rate of C/3 at a temperature of 45° C.

In some embodiments, the SE layer exhibits an ionic conductivity of at least 1.6 mS/cm, at least 1.7 mS/cm, or at least 1.8 mS/cm at 20° C.

In some embodiments, the ASSB comprising the SE layer exhibits a CCD of at least 1.2 $mA/cm^2$ at least 1.4 $mA/cm^2$, at least 1.6 $mA/cm^2$ or at least 1.8 $mA/cm^2$ at 75° C.

In some embodiments, the SE layer exhibits an ionic conductivity of at least 1.6 mS/cm, at least 1.7 mS/cm, or at least 1.8 mS/cm at 20° C., while the ASSB comprising the same exhibits a CCD of at least 1.2 $mA/cm^2$, at least 1.4 $mA/cm^2$, at least 1.6 $mA/cm^2$ or at least 1.8 $mA/cm^2$ at 75° C.

In some embodiments, the ASSB comprising the SE layer exhibits a cycling life of at least 5% longer, at least 10% longer, at least 15% longer, at least 20% longer, at least 25% longer, at least 30% longer, at least 35% longer, at least 40% longer, at least 45% longer, or at least 50% longer than that of one comprising an SE layer not doped with fluorine.

In some embodiments, the present disclosure provides an ASSB comprising a cathode layer, an anode layer, and an SE layer as described herein, wherein the anode layer comprises an anode active material layer and an anode current collector, and the anode layer does not include any anode protective layer such as Ag/C composite layer.

In one aspect, the present disclosure provides a method of preparing an SE layer. In some embodiments, an SE layer may be prepared by a conventional slurry method, a semi-solid slurry method, or a solvent-free (alternatively solventless) method.

In some embodiment, an SE layer may be prepared by:

1) coating a slurry to a scaffold on a non-stick base, leading to a coated slurry on the first non-stick base, wherein the slurry comprises a solid argyrodite electrolyte has a formula (I), $Li_{7-n}PS_{6-n}Ha_{n-x}F_x$ (I), wherein Ha is a halogen element other than fluorine (F), 0.02≤x<0.1, and 1.0<n<2.0, wherein Ha comprises at least one selected from the group consisting of chlorine (Cl), bromine (Br), iodine (I), astatine (At), and tennessine (Ts),
2) drying the coated slurry on the non-stick base, leading to an SE coating on the non-stick base; and
3) peeling the SE coating from the non-stick base, thereby obtaining an SE layer ready for subsequent assembly or lamination.

In one aspect, the present disclosure provides a method of preparing an ASSB. The method may comprise:

1) having an SE layer prepared as above, and
2) laminating an anode layer, the SE layer, and a cathode layer in the order, thus obtaining an ASSB comprising the anode layer, the SE layer and the cathode layer.

In some embodiments, the anode layer, the SE layer and the cathode layer are laminated or assembled under an isostatic pressing (IP) process. In some embodiments, the IP is conducted under a pressure in a range from 100 MPa to 500 MPa. In some embodiments, the IP is performed at a temperature in a range from 20° C. to 100° C.

In some embodiments, the slurry comprises a polymeric binder. In some embodiments, the slurry comprises a solvent. In some embodiments, particles of a solid argyrodite electrolyte, a binder and a solvent are mixed in a planetary centrifugal mixer to prepare the slurry.

In some embodiments, the solvent has a weight percentage in a range from 25% to 75%, from 25% to 70%, from 25% to 65%, from 25% to 60%, from 25% to 55%, from 25% to 50%, from 25% to 45%, from 25% to 40%, from 30% to 75%, from 30% to 70%, from 30% to 65%, from 30% to 60%, from 30% to 55%, from 30% to 50%, from 30% to 45%, from 30% to 40%, from 35% to 75%, from 35% to 70%, from 35% to 65%, from 35% to 60%, from 35% to 55%, from 35% to 50%, from 35% to 45%, or all and any ranges and subranges therebetween in the slurry.

In some embodiments, the solvent comprises at least one selected from the group consisting of comprises xylene, isobutyl isobutyrate and mixtures thereof.

In some embodiments, the binder can be a solution-type or emulsion-type binder. In some embodiments, the first and second binders are independently selected from the group consisting of a non-aqueous acrylate-type binder, a rubber-type binder such as styrene-butadiene rubber (SBR), poly (vinylidene fluoride) (PVDF), polyethylene (PE), vinylidene fluoride/hexafluoropropylene copolymer, polyvinylidene fluoride-co-trichloroethylene, polyacrylonitrile, polymethylmethacrylate, polyvinylpyrrolidone, polyvinylacetate, polyethylene-co-vinyl acetate, polyethylene oxide, polyarylate, cellulose acetate, cellulose acetate butyrate, cellulose acetate propionate, polysaccharide polymer and carboxyl methyl cellulose. In some embodiments, the binder is nonfibrillizable binder.

In some embodiments, an SE layer comprising the argyrodite electrolyte may be prepared by a solvent-less method. In some embodiments, the method comprises combining particles of an inorganic electrolyte, and a fibrillizable binder at an elevated temperature in the absence of a solvent into a dough-like mixture; and
calendaring the dough-like mixture into an SE layer with a predetermined thickness.

In one aspect, the present disclosure provides a method of preparing an ASSB. The method may comprise:

1) having an SE layer prepared as above, and
2) laminating an anode layer, an anode protective layer, the SE layer, and a cathode layer in the order, thus obtaining an ASSB.

In some embodiments, the anode protective layer comprises a carbonaceous material and a polymer binder. In some embodiments, the anode protective layer comprises a carbonaceous material and a polymer binder in the absence of lithiophilic material. In some embodiments, the anode protective layer comprises a carbonaceous material, a polymer binder and a lithiophilic material (M1). In some embodiments, the anode protective layer comprises a carbonaceous material, a polymer binder, a lithiophilic material (M1) and a second material (M2) unalloyable with lithium.

The disclosure will be better understood by reference to the Experimental Details which follow, but those skilled in the art will readily appreciate that the specific experiments detailed are only illustrative, and are not meant to limit the disclosure as described herein, as numerous variations and modifications of these exemplary embodiments are possible without undue experimentation. All such variations and modifications are within the scope of the teachings of this disclosure. It will be appreciated that the foregoing description and following examples, no matter how detailed they may appear in text, the disclosure may be practiced in many ways, and the disclosure should be construed in accordance with the appended claims and equivalents thereof.

EXAMPLES

Synthesis of Solid Electrolyte Materials

In a glove box having an inert Ar atmosphere, raw precursor powders were prepared at a stoichiometric ratio. The precursor examples include, but are not limited to, $Li_2S$, $P_2S_5$, LiCl, LiBr, LiF or combinations thereof. These powders were ball milled in a planetary ball miller at 100~500 rpm for 1-6 hours followed by a sintering at a temperature of 300~600° C. for a duration in a range from 2~24 hours.

Thereby, solid electrolyte materials with argyrodite-type structure were obtained. After a grinding procedure and a wet ball milling at 100-500 rpm for 5~30 hours in xylene, solid electrolyte particles have an average particle size in a range from 1 to 10 μm and will be used for preparation of solid electrolyte layer.

Figure 4:
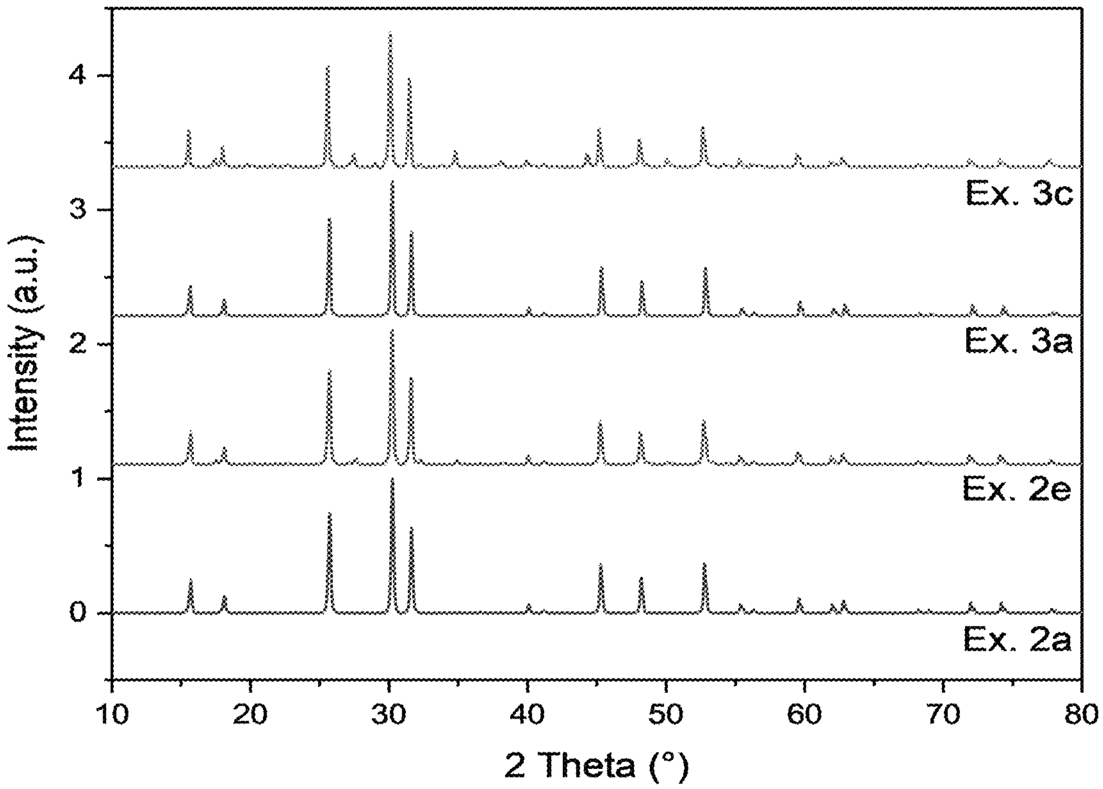
FIG. 4 shows the XRD patterns of representative solid argyrodite electrolytes according to some embodiments of the present disclosure.

Powder X-ray diffraction (XRD) measurement was performed using an X-ray diffractometer (SmartLab, Rigaku) with Cu-Kα radiation. Diffraction data were collected in steps of 0.01° over a 2θ range of 10~80° at a scan rate of 5° $min^{-1}$. XRD measurements were performed using an airtight container to prevent air exposure to the electrolyte powder. The XRD patterns of 2a, 2e, 3a and 3c are shown in FIG. 4.

Preparation of SE Layer and Preparation of Symmetric Torque Cells

For the assembly of the symmetric torque cell, 0.25 g of the sulfide electrolyte powders were first uniaxially pressed and pelletized at 5 tons in a torque cell with a diameter of 1.27 cm. Then, 2 pieces of metallic Li foils each with a thickness around 50 μm were attached to the two sides of the pelletized solid electrolyte at 10 in-lb to make a symmetric torque cell. After the cell assembly, the symmetric torque cells were placed in an oven at 75° C. for 2 hours. When the cell reached an equilibrium temperature of 75° C., the metallic Li was plated/stripped from the electrodes using step chronopotentiometry, at increasingly higher current densities from 0.1027 mA/cm$^2$ to 3.081 mA/cm$^2$ with a 0.1027 mA/cm$^2$ increment. At each current density, the symmetric torque cell was subjected to a step of positive current for 1 hour, followed by a step of negative current for 1 hour; these steps were then repeated once. By examining the overpotential at each step, the CCD was then determined by the step (or the current density) at which the overpotential drops compared to the previous step.

Two-point AC electrochemical impedance spectroscopy (EIS) was used to determine the ionic conductivity. First, the sulfide electrolyte powders or sheet/film uniaxially pressed at 7 tons in a torque cell with a diameter of 1.27 cm for 3-5 minutes. Then, the pressing force was reduced slowly to 2 tons and then held at 2 tons for EIS measurements. The EIS measurements were done in a glove box at 20° C. using a Biologic system, using a frequency range from 7 MHz to 1 kHz. Based on the EIS spectra and the dimensions of the dimension of the pressed sulfide electrolyte powders or sheet, the ionic conductivities were derived. The ionic conductivity (IC) and critical current density are summarized in Table 1.

TABLE 1

CCD and Ionic conductivity (IC) for sulfide electrolytes

| Ex. No | Composition | n | x | y | Cl/F | CCD (mA/cm$^2$) | IC (mS/cm) |
|---|---|---|---|---|---|---|---|
| 1a | $Li_6PS_5Cl$ | 1 | 0 | 0 | n/a | 1.23 | 1.78 |
| 1b | $Li_6PS_5Cl_{0.99}F_{0.01}$ | 1 | 0.01 | 0 | 99 | 2.46 | 1.53 |
| 1c | $Li_6PS_5Cl_{0.975}F_{0.025}$ | 1 | 0.025 | 0 | 39 | 1.75 | 1.63 |
| 1d | $Li_6PS_5Cl_{0.925}F_{0.075}$ | 1 | 0.075 | 0 | 12.3 | 1.03 | 1.65 |
| 1e | $Li_6PS_5Cl_{0.9}F_{0.1}$ | 1 | 0.1 | 0 | 9 | 1.44 | 1.54 |
| 2a | $Li_{5.6}PS_{4.6}Cl_{1.4}$ | 1.4 | 0 | 0 | n/a | 0.51 | 4.57 |
| 2b | $Li_{5.6}PS_{4.6}Cl_{1.39}F_{0.01}$ | 1.4 | 0.01 | 0 | 139 | 1.13 | 2.97 |
| 2c | $Li_{5.6}PS_{4.6}Cl_{1.375}F_{0.025}$ | 1.4 | 0.025 | 0 | 55 | 1.85 | 2.90 |
| 2d | $Li_{5.6}PS_{4.6}Cl_{1.325}F_{0.075}$ | 1.4 | 0.075 | 0 | 17.6 | 1.95 | 1.91 |
| 2e | $Li_{5.6}PS_{4.6}Cl_{1.3}F_{0.1}$ | 1.4 | 0.1 | 0 | 13 | 0.82 | 1.60 |
| 3a | $Li_{5.4}PS_{4.4}Cl_{1.6}$ | 1.6 | 0 | 0 | n/a | 0.72 | 2.77 |
| 3b | $Li_{5.4}PS_{4.4}Cl_{1.575}F_{0.025}$ | 1.6 | 0.025 | 0 | 63 | 1.85 | 2.19 |
| 3c | $Li_{5.4}PS_{4.4}Cl_{1.5}F_{0.1}$ | 1.6 | 0.1 | 0 | 15 | 1.64 | 0.85 |
| 4a | $Li_{5.4}PS_{4.4}Cl_{1.2}F_{0.1}Br_{0.3}$ | 1.6 | 0.1 | 0.3 | 12 | 1.85 | 1.64 |

As shown in Table 1, the SE layer of 1a exhibited a CCD and IC of 1.23 mA/cm$^2$ and 1.78 mS/cm, respectively. When the total molar amount of Cl is 1.4, the SE layer of 2a exhibited a CCD and IC of 0.51 mA/cm$^2$ and 4.57 mS/cm, respectively. When the total molar amount of Cl is 1.6, the SE layer of 3a exhibited a CCD and IC of 0.72 mA/cm$^2$ and 2.77 mS/cm, respectively. Though the ionic conductivity of the SE is increased with a higher total molar amount of halogen element such as Cl, the CCD value decreased in comparison with the SE layer of 1a in which the molar amount of Cl is 1.0. It suggests that simply adjusting amount of halogen element (n) with no fluorine dopant (x=0) would not achieve a desirable ionic conductivity.

When the total molar amount of Cl and F (value of n) is fixed at 1.0 for examples 1a through 1e, the SE layers exhibited an ionic conductivity of no greater than 1.80 mS/cm and some are not higher than 1.70 mS/cm or even 1.60 mS/cm. None of the examples 1a through 1e could simultaneously achieve an ionic conductivity of at least 1.60 mS/cm at 20° C. and a CCD of at least 1.80 mA/cm$^2$ at 75° C. It suggests that when the value of n is fixed at 1.0, adjusting amount of fluorine dopant itself would not be able to achieve a desirable ionic conductivity and CCD.

When the total molar amount of Cl and F (value of n) is increased from 1.0 to 1.4, the SE layers exhibited a much better ionic conductivity. SE layers of examples 2b and 2e (n=1.4, x=0.01, 0.025, 0.075 or 0.1) exhibited an ionic conductivity of 2.97 mS/cm, 2.90 mS/cm, 1.91 mS/cm and 1.60 mS/cm at 20° C., respectively. Each of them was significantly higher than the corresponding example with n having a value of 1.0. The results strongly suggest that the molar amount of fluorine as a dopant plays a critical role different from the total molar amount of halogen. Only when both value of n and value of x are within a certain range, a high ionic conductivity and CCD could be achieved simultaneously. Among examples 2a through 2e, SE layer of 2c (n=1.4, x=0.025) unexpectedly exhibited an IC of 2.90 mS/cm at 20° C. and a CCD of 1.85 mA/cm$^2$ at 75° C. SE layer of 2d (n=1.4, x=0.075) unexpectedly exhibited an IC of 1.91 mS/cm at 20° C. and a CCD of 1.85 mA/cm$^2$ at 75° C.

When the value of n is 1.6 for example 3a, 3b and 3c, the SE layer of example 3b (n=1.6, x=0.025) unexpectedly exhibited a CCD and IC of 1.85 mA/cm$^2$ and 2.19 mS/cm, respectively. The SE layer of 3c (n=1.6, x=0.1), however, exhibited an IC of only 0.85 mS/cm at 20° C. and a CCD of 1.64 mA/cm$^2$ at 75° C.

Figure 5:
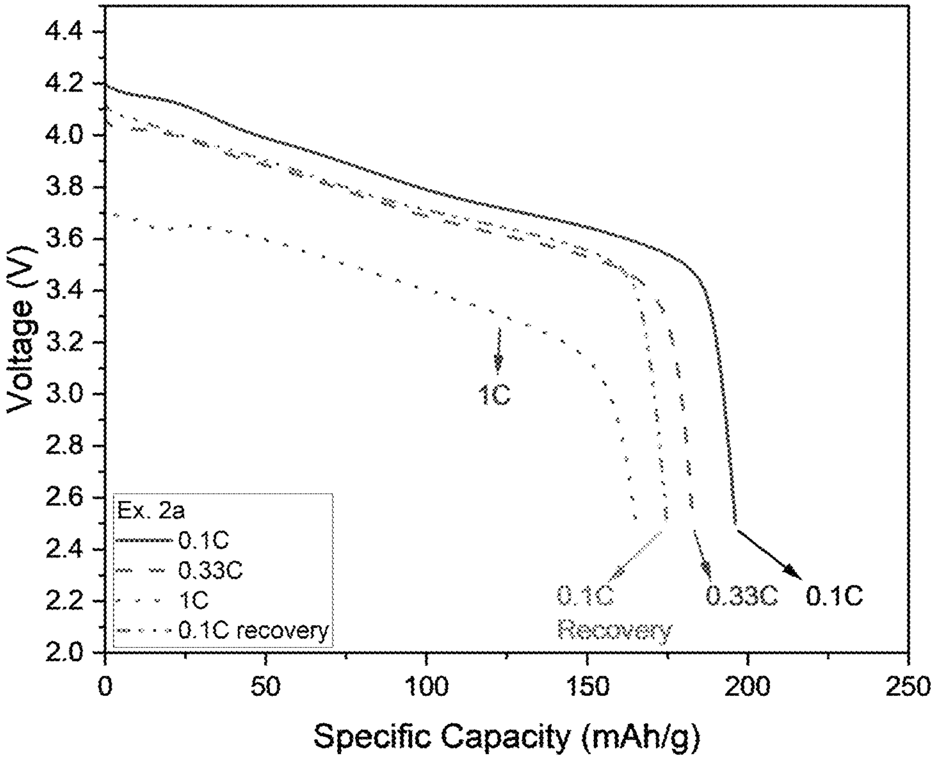
FIG. 5 shows the pouch cell rate performance of representative solid argyrodite electrolytes according to some embodiments of the present disclosure.
Figure 6:
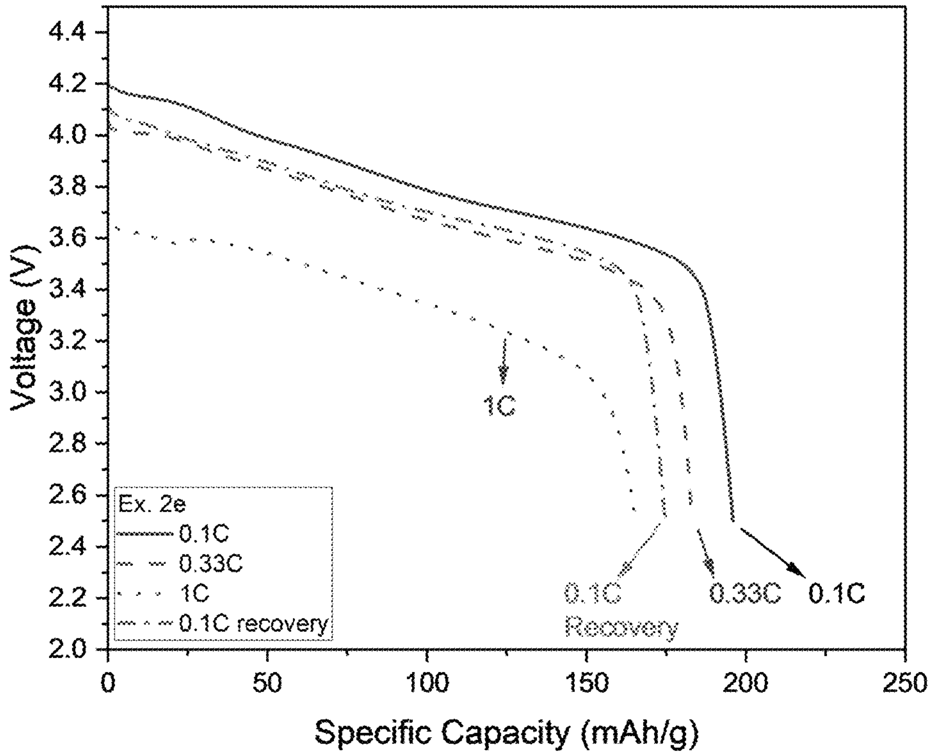
FIG. 6 shows the pouch cell rate performance of representative solid argyrodite electrolytes according to some embodiments of the present disclosure.

FIGS. 5 and 6 show the rate performance of pouch cells comprising solid argyrodite electrolytes of examples 2a and 2e, respectively. The key characteristics are summarized in Tables 2 and 3.

Preparation of SE Layer Based on Slurry Method and Assembly of Pouch Cells

Particles of the above sulfide electrolyte with a formula of $Li_{5.6}PS_{4.6}Cl_{1.4}$ (2a) and $Li_{5.6}PS_{4.6}Cl_{1.3}F_{0.1}$ (2e) were mixed with an acrylate binder (0.5 wt %-2.0 wt % based weight of sulfide electrolyte) and isobutyl isobutyrate as solvent, resulting a slurry. The slurry was applied to a scaffold such as non-woven fabric on a non-stick base. After the removal of the solvent, the dried coating (alternatively, sheet or film) was flexible and was peeled off from the non-stick base, thereby obtaining a solid electrolyte layer. The thickness of the solid electrolyte layer was between 60 μm and 80 μm. The solid electrolyte layer was then punched into desired dimensions for ionic conductivity measurements and pouch cell assembly.

TABLE 2

Rate performance of pouch cells comprising SE of 2a and 2e

| SE in Cell | Initial Discharge Specific Capacity, mAh/g @0.1 C | @0.33 C | @1 C | 1 C/0.33 C capacity ratio, % | Recovery at 0.1 C discharge [a], mAh/g | First Cycle CE, % |
|---|---|---|---|---|---|---|
| 2a | 196.12 | 182.88 | 165.05 | 90.25 | 174.85 | 88.18 |
| 2e | 195.96 | 183.07 | 165.27 | 90.28 | 174.70 | 87.89 |

[a]Recovery at 0.1 C discharge is determined by the fourth cycle of the rate test (or the second 0.1 C cycle).

The solid electrolyte layer was stacked between a cathode layer and an anode layer; the layers were laminated or assembled under an isostatic press (IP) process to obtain an ASSB. In the examples for ASSB performances in Tables 2 and 3 and FIGS. 5 to 8, an anode protective layer (a thickness around 5-20 μm) comprising a polymeric binder and carbon-based material in the absence of lithium alloyable material was used.

The rate performance test of pouch cells comprising the SE of 2a and 2e was performed at a temperature of 45° C. for 4 cycles at different C-rates in the following order: 0.1C, 0.33C, 1C, 0.1C. The fourth cycle of the rate test (or the second 0.1C cycle) is termed 0.1C recovery. The rate performance plots are shown in FIGS. 5 and 6 and summarized in Table 2.

TABLE 3

Cycling performance of pouch cells comprising SE of 2a and 2e at a rate of 0.33C

| SE in Cell | Capacity retention rate, % of 20$^{th}$ cycle | of 50$^{th}$ cycle | of 100$^{th}$ cycle |
|---|---|---|---|
| 2a | 99.19 | 97.78 | 94.29 |
| 2e | 100.33 | 100.19 | 98.40 |

Note:
The capacity retention rate was determined by comparing the n$^{th}$ 0.33C cycle to the first 0.33C cycle during the cycling test.

Note: The capacity retention rate was determined by comparing the n$^{th}$ 0.33C cycle to the first 0.33C cycle during the cycling test.

Figure 7:
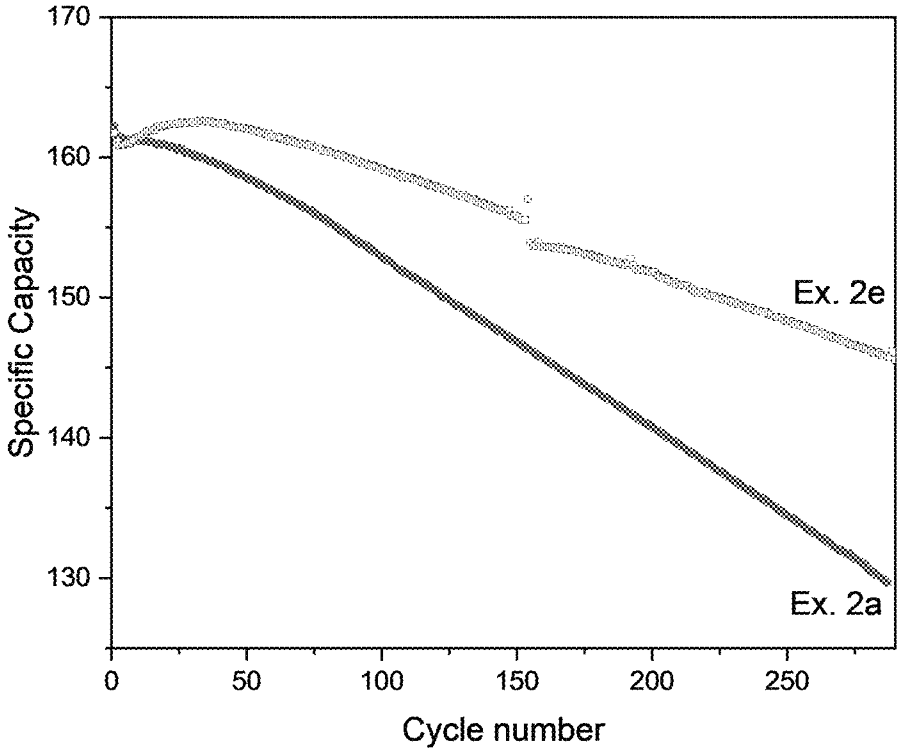
FIG. 7 shows the pouch cell cycling performance of representative solid argyrodite electrolytes according to some embodiments of the present disclosure.
Figure 8:
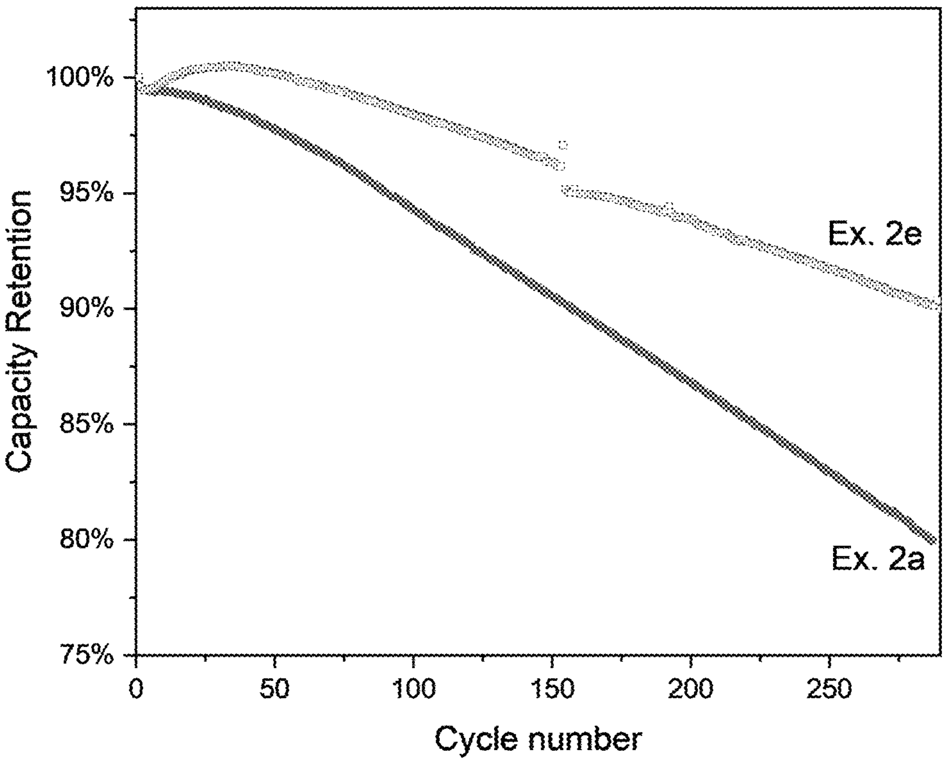
FIG. 8 shows the pouch cell cycling performance of representative solid argyrodite electrolytes according to some embodiments of the present disclosure.

Following the rate performance test, the cycling performance test of pouch cells comprising the SE of 2a and 2e was performed at a temperature of 45° C. at 0.33C. The cycling plots are shown in FIGS. 7 and 8 and the results are summarized in Table 3. It clearly shows that the F-doped SE exhibits a higher capacity retention rate in comparison to the one with an SE not doped with fluorine.

Preparation of Full Torque Cells

In addition to symmetric torque cell with Li, the SE materials were also evaluated in full torque cells. A full torque cell comprising a cathode layer, an anode layer, and a solid electrolyte layer with the SE material was typically prepared as follows. A Li foil as the anode layer was first placed at the bottom. Then, a desired amount of the sulfide electrolyte powders were placed on top of the Li foil and flattened to form the solid electrolyte layer. Lastly, a cathode layer comprising a cathode active material (CAM), a conductive agent and inorganic catholyte was distributed on top of the sulfide electrolyte layer, thus leading to a pre-assembly. After the pre-assembly was uniaxially pressed at 5 tons, a full torque cell was obtained.

Before the rate performance test and cycling performance test, the full torque cell was conditioned by placing in an oven at 75° C. for 2 hours while being clamped at 45 in-lb. After reaching an equilibrium temperature of 75° C., the cells were cycled at 0.1C, 0.33C and 1C to evaluate the rate performance and were further cycled at 0.5C continuously to evaluate the cycling performance.

The rate performance of full torque cells is summarized in Table 4 while the cycling performance is shown in Table 5. The full torque cell cycling data shows that specific molar amount of halogen (n) and specific molar amount of fluorine dopant (x) are crucial to improving cell performance.

TABLE 4

| Rate performance of full torque cells comprising SE materials | | | | |
|---|---|---|---|---|
| SE in | Initial Discharge Specific Capacity, mAh/g | | | 1 C/0.33 C capacity |
| Cell | @0.1 C | @0.33 C | @1 C | ratio, % |
| 1a | 215.47 | 213.55 | 205.04 | 96.01 |
| 1c | 205.38 | 203.20 | 196.59 | 96.75 |
| 1d | 217.41 | 203.19 | 196.58 | 96.75 |
| 1e | 206.17 | 204.73 | 198.15 | 96.79 |
| 2a | 195.48 | 195.17 | 187.72 | 96.18 |
| 2c | 222.70 | 221.41 | 215.24 | 97.21 |
| 2d | 221.86 | 221.86 | 216.25 | 97.47 |
| 2e | 219.66 | 220.26 | 213.67 | 97.01 |

Among examples with n=1.0, i.e., Ex. 1a, 1c, 1d and 1e, it can be seen that the incorporation of F has a very limited role in determining the rate performance but significantly deteriorated the cycling performance. Particularly, Ex. 1c, 1d and 1e (n=1.0, x=0.025, 0.075 and 0.1), though having a similar CCD and IC, the full torque cells exhibited a much worse cycling performance.

However, when n is greater than 1.0, for example, Ex. 2a, 2c, 2d and 2e, where n=1.4, the incorporation of F into SE material unexpectedly demonstrated a role different from n=1.0. When n>1.0 and 0≤x≤0.1, the SE layers could have both good CCD and IC and the full torque cells with Ex. 2c and 2d exhibited both improved rate performance and rate performance. It clearly demonstrated that both the total molar amount of halogen (n) and molar amount of F (x) are critically important.

In some embodiments, the molar amount of F (x) should not be too high, i.e., should be less than a critical threshold value (such as 0.1). When an excessive amount of F is incorporated into the SE material, it may lead to impurity phases that may deteriorate the electrochemical performance. For example, Ex. 2e (n=1.4 and x=0.1) had a relatively low IC and CCD. Though it demonstrated a good cycling performance, the rate performance is less desirable.

TABLE 5

| Cycling performance of full torque cells comprising SE materials | | | |
|---|---|---|---|
| | Capacity retention rate, % | | |
| SE in Cell | of 5$^{th}$ cycle | of 10$^{th}$ cycle | of 20$^{th}$ cycle |
| 1a | 98.10 | 97.31 | 87.74 |
| 1c | 98.13 | 37.02 | 14.53 |
| 1d | 96.76 | 92.32 | 62.48 |
| 1e | 98.10 | 89.90 | 83.00 |
| 2a | 97.97 | 94.94 | 87.82 |
| 2c | 98.49 | 96.04 | 90.82 |
| 2d | 98.61 | 96.68 | 91.98 |
| 2e | 98.43 | 95.97 | 91.25 |

Aspects

In a first aspect of the present disclosure, a solid argyrodite electrolyte has a formula (I) $Li_{7-n}PS_{6-n}Ha_{n-x}F_x$ (I), wherein Ha is a halogen element other than fluorine (F), 0.02≤x≤0.1, and 1.0<n<2.0.

In a second aspect according to the first aspect, 0.02≤x≤0.08. In some embodiments, 0.025≤x≤0.075.

In a third aspect according to the first aspect, 1.2≤n≤1.6.

In a fourth aspect according to the first aspect, Ha comprises at least one selected from the group consisting of chlorine (Cl), bromine (Br), iodine (I), astatine (At), and tennessine (Ts).

In a fifth aspect according to any preceding aspect, the solid argyrodite electrolyte comprises at least one selected from the group consisting of $Li_{5.6}PS_{4.6}Cl_{1.375}F_{0.025}$, $Li_{5.6}PS_{4.6}Cl_{1.35}F_{0.05}$, $Li_{5.6}PS_{4.6}Cl_{1.325}F_{0.075}$, $Li_{5.6}PS_{4.6}Br_{1.375}F_{0.025}$, $Li_{5.6}PS_{4.6}Br_{1.35}F_{0.05}$, $Li_{5.6}PS_{4.6}Br_{1.325}F_{0.075}$, $Li_{5.6}PS_{4.6}I_{1.375}F_{0.025}$, $Li_{5.6}PS_{4.6}I_{1.325}F_{0.075}$, $Li_{5.6}PS_{4.6}I_{1.35}F_{0.05}$, $Li_{5.4}PS_{4.4}Cl_{1.575}F_{0.025}$, $Li_{5.4}PS_{4.4}Cl_{1.55}F_{0.05}$, $Li_{5.4}PS_{4.4}Cl_{1.525}F_{0.075}$, $Li_{5.4}PS_{4.4}Br_{1.575}F_{0.025}$, $Li_{5.4}PS_{4.4}Br_{1.55}F_{0.05}$, $Li_{5.4}PS_{4.4}Br_{1.525}F_{0.075}$, $Li_{5.4}PS_{4.4}I_{1.575}F_{0.025}$, $Li_{5.4}PS_{4.4}I_{1.55}F_{0.05}$, $Li_{5.4}PS_{4.4}I_{1.525}F_{0.075}$ and mixtures thereof.

In a sixth aspect according to any of the first through fourth aspects, Ha comprises at least two different halogen elements other than fluorine (F) and the solid argyrodite electrolyte has a formula (II), $Li_{7-n}PS_{6-n}Ha1_{n-x-y}Ha2_yF_x$ (II), wherein each of Ha1 and Ha2 comprises at least one selected from the group consisting of chlorine (Cl), bromine (Br), iodine (I), astatine (At), and tennessine (Ts), and Ha1 is different from Ha2, wherein 0.02≤y≤0.4.

In a seventh aspect, an all-solid state battery (ASSB) comprises a cathode layer; an anode layer; and a solid electrolyte layer between the cathode layer and the anode layer and comprising the solid argyrodite electrolyte according to any preceding aspect.

In an eighth aspect according to the seventh aspect, the ASSB exhibits a critical current density (CCD) of at least 1.80 mA/cm$^2$ at 75° C. and the SE layer of the ASSB exhibits an ionic conductivity of at least 1.60 mS/cm at 20° C. In some embodiments, the solid electrolyte layer has a thickness in a range from 5 μm to 300 μm.

In a nineth aspect according to the seventh aspect, the cathode layer comprises a cathode current collector and a cathode active material layer on the cathode current collector. In some embodiments, the cathode active material layer comprises at least one cathode active material containing elements Li, Ni, and Co and at least one element of Mn and Al. In some embodiments, the cathode current collector comprises at least one selected from the group consisting of Al, Ti, stainless steel, and alloy thereof.

In a tenth aspect according to the seventh aspect, the anode layer comprises an anode current collector and an anode active material layer on the anode current collector.

In an eleventh aspect according to the tenth aspect, the anode active material layer comprises at least one anode active material selected from the group consisting of lithium metal and lithium alloy.

In a twelfth aspect according to the tenth aspect, the anode current collector comprises at least one selected from the group consisting of Cu, stainless steel, Ti, Ni, Ta, Mo, Nb, Sn, Zn, Ag, Au, and alloy thereof.

In a thirteenth aspect according to the seventh aspect, the anode layer further comprises an anode protective layer adjacent to the SE layer, wherein the anode protective layer comprises a polymeric binder and a carbonaceous material in the absence of lithium alloyable material (M1).

In a fourteenth aspect according to the seventh aspect, the anode layer further comprises an anode protective layer adjacent to the SE layer, the anode protective layer comprising a polymeric binder, a carbonaceous material and particles of a lithium alloyable material (M1), wherein the particles of the lithium alloyable material are distributed in a matrix of the carbonaceous material.

In a fifteenth aspect according to the fourteenth aspect, the lithium alloyable material (M1) comprises at least one selected from the group consisting of Ag, Zn, Ti, Cd, Mg, Al, Ga, Si, Ge, In, Sn, Pb, Bi, and Sb.

In a sixteenth aspect according to the fourteenth aspect, the carbonaceous material comprises at least one selected from the group consisting of carbon fiber, carbon nanotube, carbon black, acetylene black, Ketjen black, channel black, furnace black, lamp black, thermal black, natural graphite, artificial graphite and chemically reduced graphene oxide (cr-GO).

In a seventeenth aspect according to the fourteenth aspect, the anode protective layer further comprises particles of a second material (M2) unalloyable with lithium, wherein the particles of the lithium alloyable material (M1) and lithium unalloyable material (M2).

In an eighteenth aspect according to the seventeenth aspect, the second material (M2) unalloyable with lithium comprises at least one selected from the group consisting of Cu, Mo, Ir, W, Co, Ni, Ru, Fe, Se, Ta, Nb, V, and Zr.

In a nineteenth aspect according to the seventh aspect, the ASSB exhibits a capacity retention rate of at least 98.0%, after at least 50 cycles at a rate of C/3 at 45° C.

In the twentieth aspect according to the seventh aspect, the ASSB exhibits a capacity retention rate of at least 94.5%, after at least 100 cycles at a rate of C/3 at 45° C.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Various embodiments of the features of this disclosure are described herein. However, it should be understood that such embodiments are provided merely by way of example, and numerous variations, changes, and substitutions can occur to those skilled in the art without departing from the scope of this disclosure. It should also be understood that various alternative to the specific embodiments described herein are also within the scope of this disclosure.

We claim:

1. A solid argyrodite electrolyte with a formula (I)

$$Li_{7-n}PS_{6-n}Ha_{n-x}F_x \quad \text{(I)},$$

wherein Ha is a halogen element other than fluorine (F), $0.02 \leq x \leq 0.08$, and n=1.4, and wherein Ha and F have a molar ratio between 1.32/0.08 and 1.38/0.02.

2. The solid argyrodite electrolyte of claim 1, wherein Ha comprises at least one selected from the group consisting of chlorine (Cl), bromine (Br), iodine (I), astatine (At), and tennessine (Ts).

3. The solid argyrodite electrolyte of claim 1, wherein the solid argyrodite electrolyte comprises at least one selected from the group consisting of $Li_{5.6}PS_{4.6}Cl_{1.375}F_{0.025}$, $Li_{5.6}PS_{4.6}Cl_{1.35}F_{0.05}$, $Li_{5.6}PS_{4.6}Cl_{1.325}F_{0.075}$, $Li_{5.6}PS_{4.6}Br_{1.375}F_{0.025}$, $Li_{5.6}PS_{4.6}Br_{1.35}F_{0.05}$, $Li_{5.6}PS_{4.6}Br_{1.325}F_{0.075}$, $Li_{5.6}PS_{4.6}I_{1.375}F_{0.025}$, $Li_{5.6}PS_{4.6}I_{1.325}F_{0.075}$, $Li_{5.6}PS_{4.6}I_{1.35}F_{0.05}$, and mixtures thereof.

4. The solid argyrodite electrolyte of claim 1, wherein Ha comprises at least two different halogen elements other than fluorine (F) and the solid argyrodite electrolyte has a formula (II), $Li_{7-n}PS_{6-n}Ha1_{n-x-y}Ha2_yF_x$ (II), wherein each of Ha1 and Ha2 comprises at least one selected from the group consisting of chlorine (Cl), bromine (Br), iodine (I), astatine (At), and tennessine (Ts), and Ha1 is different from Ha2, wherein n=1.4 and $0.02 \leq y \leq 0.4$.

5. An all-solid state battery (ASSB) comprising:

a cathode layer;

an anode layer; and a solid electrolyte layer between the cathode layer and the anode layer and comprising the solid argyrodite electrolyte of claim 1.

6. The ASSB of claim 5, wherein the ASSB exhibits a critical current density (CCD) of at least 1.60 mA/cm$^2$ at 70° C. and the SE layer of the ASSB exhibits an ionic conductivity of at least 1.80 mS/cm at 20° C.

7. The ASSB of claim 5, wherein the cathode layer comprises a cathode current collector and a cathode active material layer on the cathode current collector.

8. The ASSB of claim 5, wherein the anode layer comprises an anode current collector and an anode active material layer on the anode current collector.

9. The ASSB of claim 8, wherein the anode active material layer comprises at least one anode active material selected from the group consisting of lithium metal and lithium alloy.

10. The ASSB of claim 8, wherein the anode current collector comprises at least one selected from the group consisting of Cu, stainless steel, Ti, Ni, Ta, Mo, Nb, Sn, Zn, Ag, Au, and alloy thereof.

11. The ASSB of claim 5, wherein the anode layer further comprises an anode protective layer adjacent to the SE layer, wherein the anode protective layer comprises a polymeric binder and a carbonaceous material in absence of lithium alloyable material.

12. The ASSB of claim 5, wherein the anode layer further comprises an anode protective layer adjacent to the SE layer, wherein the anode protective layer comprises a polymeric binder, a carbonaceous material and particles of lithium alloyable material (M1), wherein the particles of the lithium alloyable material are distributed in a matrix of the carbonaceous material.

13. The ASSB of claim 12, wherein the lithium alloyable material (M1) comprises at least one selected from the group consisting of Ag, Zn, Ti, Cd, Mg, Al, Ga, Si, Ge, In, Sn, Pb, Bi, and Sb.

14. The ASSB of claim 12, wherein the carbonaceous material comprises at least one selected from the group consisting of carbon fiber, carbon nanotube, carbon black, acetylene black, Ketjen black, channel black, furnace black, lamp black, thermal black, natural graphite, artificial graphite and chemically reduced graphene oxide (cr-GO).

15. The ASSB of claim 12, wherein the anode protective layer further comprises particles of a second material (M2) unalloyable with lithium, wherein the particles of the lithium alloyable material and the second material are distributed in the matrix of the carbonaceous material.

16. The ASSB of claim 15, wherein the second material (M2) unalloyable with lithium comprises at least one selected from the group consisting of Cu, Mo, Ir, W, Co, Ni, Ru, Fe, Se, Ta, Nb, V, and Zr.

17. The ASSB of claim 5, wherein the ASSB exhibits a capacity retention rate of at least 98.0%, after at least 50 cycles at a rate of C/3 at 45° C.

18. The ASSB of claim 5, the ASSB exhibits a capacity retention rate of at least 94.5%, after at least 100 cycles at a rate of C/3 at 45° C.

* * * * *